United States Patent [19]
Gumpesberger

[11] Patent Number: 5,325,815
[45] Date of Patent: Jul. 5, 1994

[54] SIFTING DEVICE

[76] Inventor: Ralph P. Gumpesberger, 59 Osborne Ave (B. Apt.), Toronto, Ontario, Canada, M4E 3B1

[21] Appl. No.: 114,409

[22] Filed: Sep. 1, 1993

[51] Int. Cl.$^5$ ............................................. A01K 29/00
[52] U.S. Cl. .................................................. 119/166
[58] Field of Search ................ 119/161, 165, 166; 209/235, 355, 356

[56] References Cited

U.S. PATENT DOCUMENTS

| | | | |
|---|---|---|---|
| 1,027,734 | 5/1912 | Hunnicutt | 209/355 |
| 4,505,226 | 3/1985 | Carlson | 119/166 |
| 4,602,593 | 7/1986 | Gross | 119/166 |
| 5,193,488 | 3/1993 | Walton | 119/166 |

Primary Examiner—Thomas Price
Attorney, Agent, or Firm—Bereskin & Parr

[57] ABSTRACT

A device for sifting a siftable material comprises at least three nestable trays. The trays are stacked to form a vertically stacked array. Each tray has a base having a plurality of ribs defining a plurality of openings sized to permit the material to pass through, while preventing passage of large objects. The openings of each tray are arranged in a pre-set pattern so that pairs of trays may be nested together with the openings of one tray blocked by the ribs of the other. The trays may be identical with the openings arranged asymmetrically in the base of each tray, so that the necessary interference or blocking is achieved by rotating each tray relative to the adjacent tray. Alternatively, the openings can be symmetrically located with two different trays being provided, having complementary patterns of openings. The stacked array of trays can be configured as a cat litter container, or used for sifting a variety of the material.

23 Claims, 7 Drawing Sheets

SIFTING DEVICE

FIELD OF THE INVENTION

This invention relates to devices for sifting particulate materials, and in particular to a device having several stacked, reusable trays.

BACKGROUND OF THE INVENTION

The use of devices to sift siftable or particulate material to remove relatively larger items found in the material is well known. Sifting devices enjoy a wide range of uses, from separating aggregates and other granular materials in quarry or concrete mixing operations, to sifting ingredients for baked foods, to use with pet litter boxes.

With pet litter boxes, screens of various sorts have been employed for removing solid excrement deposited in pet litter and sand in place of the traditional method of using a hand-held scoop or strainer. Sifting devices not only reduce the unpleasantness of the operation, but they reduce waste by minimizing the amount of unused litter being thrown out, and so more litter is reused. Examples of such devices are shown in U.S. Pat. Nos. 3,796,188, 4,217,857, 4,505,226, 4,602,593, 4,615,300 and 4,771,731. However, these prior art litter box devices are impractical and cumbersome to use and are unduly complex to make because of the various movable flaps, plates and false bottoms. They also waste time. In many cases, the screens are used in combination with imperforate pans to trap the litter.

It is therefore desired to provide a sifting device having a series of stacked trays adapted to hold a quantity of siftable material. Each of these trays being bereft of movable parts, yet being capable of sifting the material when lifted off of the stack.

SUMMARY OF THE INVENTION

In accordance with the present invention, there is provided a device for sifting a siftable material, the device comprising at least three nestable trays, each tray having a base and sidewalls projecting upwardly and outwardly from the base to retain a siftable material and the trays having corresponding profiles so that said trays may be nested one atop another to form a vertically stacked array of said trays capable of holding a quantity of said material, said base of each tray having a plurality of rib means defining a plurality of openings sized to permit said material to pass through and to prevent the passage of substantially larger objects found in said material, said openings in each tray being arranged in a pre-set pattern such that the openings of one of said trays may be blocked by the rib means of at least one other tray when said trays are nested, each of said trays being capable of sifting said material by lifting the uppermost tray of said stacked array and allowing the material therein to pass through the openings, and with the other trays blocking one another to prevent passage of the material therethrough, the lifted tray being returnable to the bottom of said stacked array after being cleared of any retained objects.

The device may be provided with openings arranged either symmetrically or asymmetrically relative to a line of symmetry of the base, depending on the embodiment.

Where the openings are arranged asymmetrically, they can be positioned so that by simple rotation of one tray, the rib means of that tray align, overlap and block the openings of an adjacent tray, so that the bases of the two trays form a substantially continuous base to prevent any passage of any material.

Where the openings are arranged symmetrically, the device can comprise two different tray configurations, which are essentially complementary. Two of each type of tray would be provided, so that they can be stacked alternately with one another. This ensures that, if any one tray is removed from the stack, there is always at least a pair of trays, one of each type, nested to form a continuous base to prevent passage of the selected material.

In this second embodiment, each of the two types of trays is configured to have its rib means located so as to overlap and block the openings in the other type of tray. The symmetry may be about more than one axis.

The second embodiment has the advantage that, due to the symmetry, the trays can be configured so that they can be placed in any orientation relative to one another, and the user does not have to be concerned about the relative rotation between the trays, provided that the trays in the stack alternate between the two types of trays, and that there are at least four trays present (two of each pair).

On the other hand, the first embodiment of the device has the advantage that just a single type of tray can be provided, and further that only three trays need to be provided, making this version more economical than the second embodiment. However with three trays, it is necessary that the trays be rotated or otherwise arranged so that the rib means of each tray blocks the openings of an immediately adjacent tray. To this end, each type of the first embodiment can be provided with handles or other indicators around its edge, to indicate its relative orientation or rotational position, to enable a user, readily and simply, to stack the trays. In both embodiments of the invention, it is preferred for the openings of the ribs to have uniform sizes and to be uniformly arranged in a grid or array across a major part of the base. Generally, it will be necessary for the base to be thicker than the side walls, due to inclination of the side walls to make sure that no gap exists between the nested trays. To ensure that the base is not overly thick or heavy, the rib means and the base can be formed from hollow elements. The rib means can have an inverted U-shaped section, formed by depending flanges. These flanges can be continuous across the width and length of the base, to form a reinforcing grid.

DESCRIPTION OF THE DRAWINGS

Preferred embodiments of the present invention are described below with reference to the accompanying drawings in which.

DESCRIPTION OF THE PREFERRED EMBODIMENTS

Figure 1:
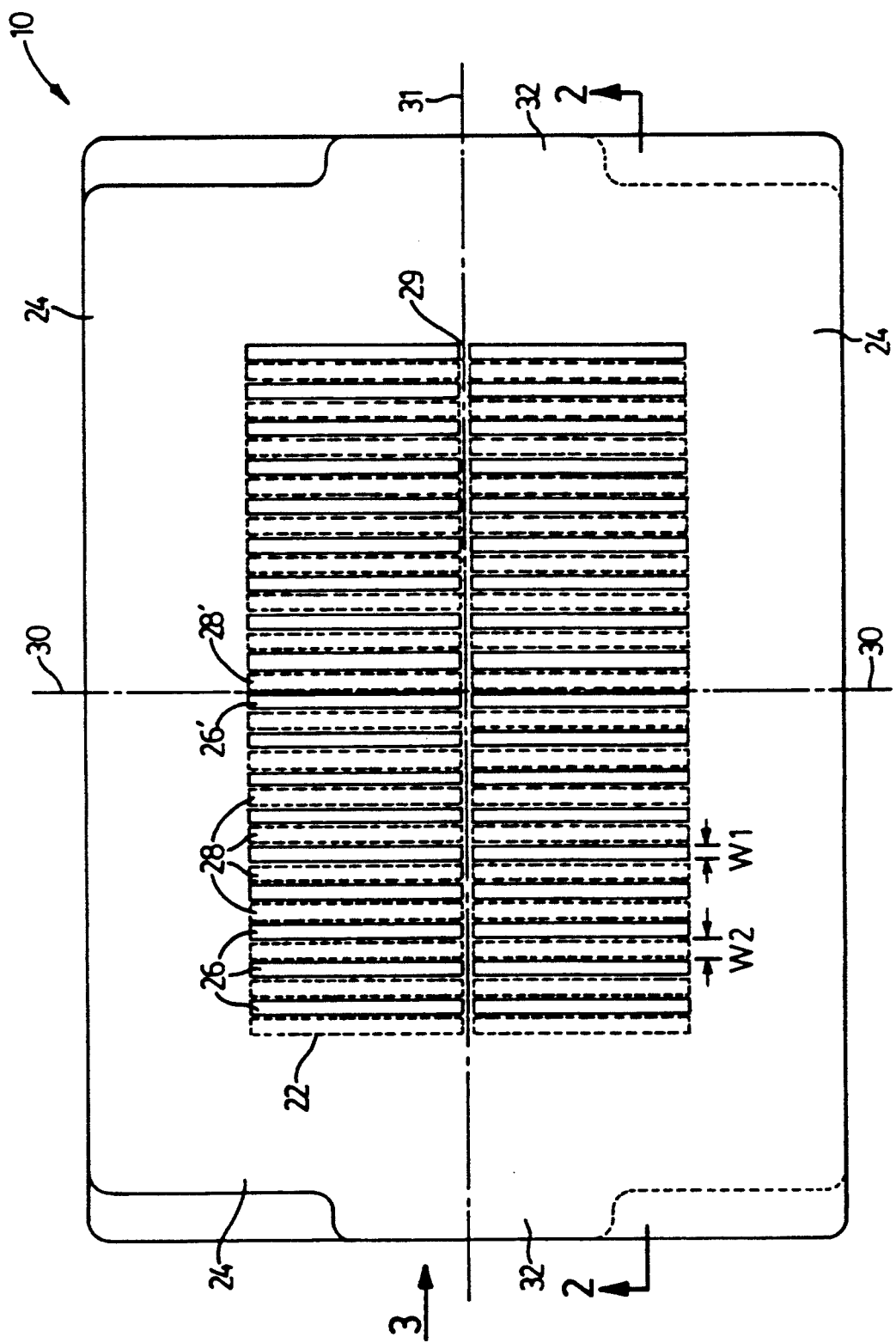
FIG. 1 is a plan view of a stacked array of trays according to a preferred embodiment of the invention.
Figure 2:
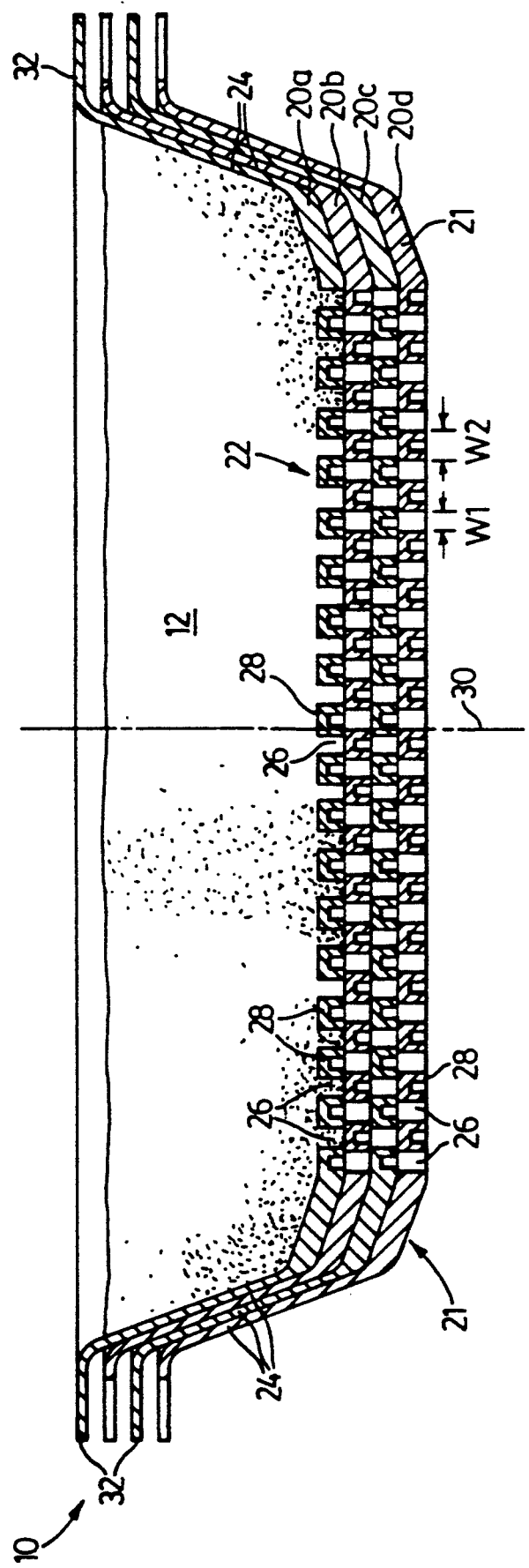
FIG. 2 is a cross-section of said stacked array of trays showing a siftable material placed therein taken along the line 2—2 of FIG. 1.
Figure 3:
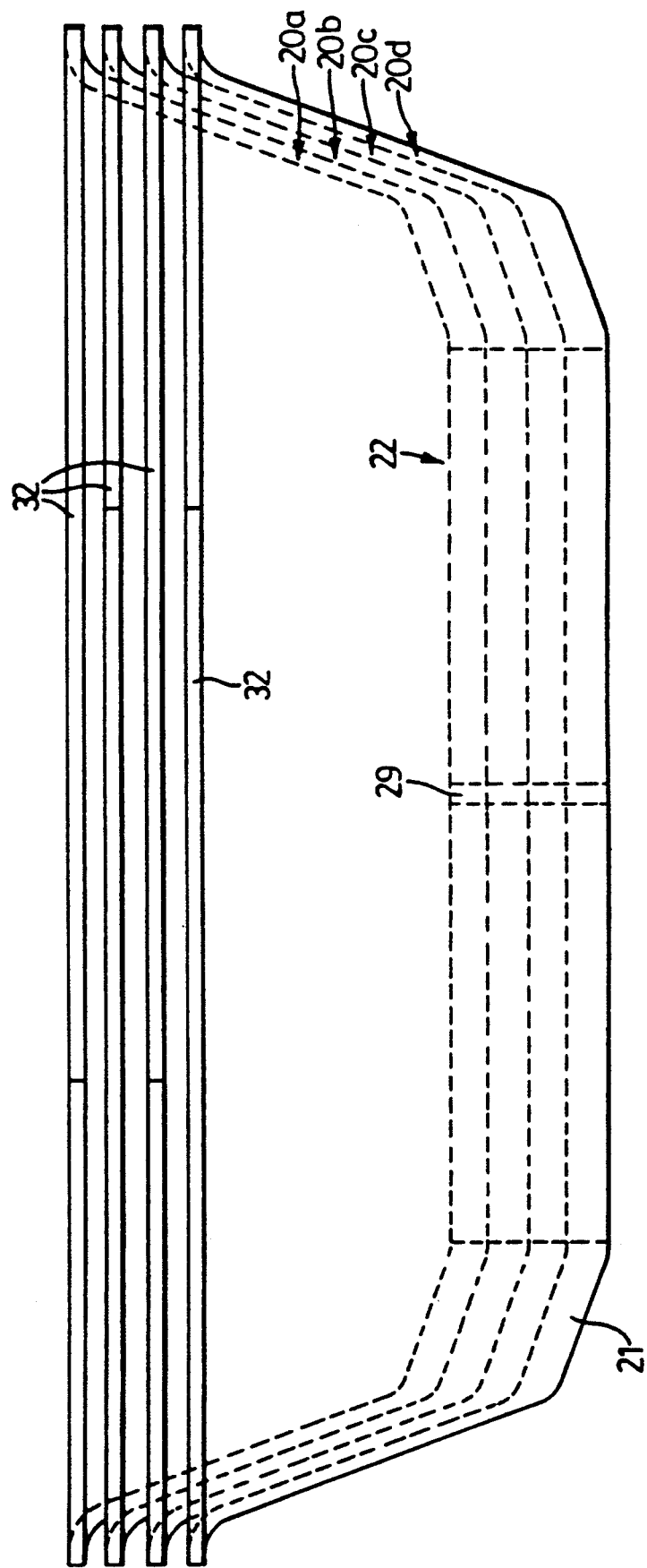
FIG. 3 is an end view of said stacked array of trays as viewed in the direction of arrow 3 in FIG. 1.

Reference is first made to FIGS. 1-3 which show a first preferred embodiment of a device, generally indicated by 10, for sifting a siftable material 12. It will be understood that a siftable material in this context is any granular or particulate material which may need to be sifted for any variety of reasons, such as: sifting gravel or sand to separate or grade like-sized material; sifting flour, bread crumbs, sugar, baking powder or other baking ingredients to break up any lumps in the ingredients; and, sifting pet litter to remove and dispose solid waste and/or liquid waste clumped litter from the unused portion of the litter. For ease of reference and illustrative purposes only, pet litter is chosen as the material 12 in the ensuing description. Consequently, the device 10 will also sometimes be referred to as a litter box, and the material 12 as litter 12.

The device 10, as shown in FIG. 2, has four substantially identical, interchangeable trays, denoted top to bottom as 20a, 20b, 20c and 20d, nested or stacked one atop another to form a vertical array or stack of trays. As will be discussed below, the invention requires that there be three or more trays 20 in any one stack, and that at least two adjacent trays remain nested at any time to retain the litter 12.

Each tray 20 has a base 22 and sidewalls 24, projecting upwardly and outwardly from the base 22. In the FIG. 1 embodiment, the tray 20 is generally rectangular in plan view and the base 22 is substantially flat in cross-section. The base has inclined edge or ramp portions 21. Variations of the tray 20 may include, for example, a square, circular or hexagonal shaped tray 20 and a bowed or wavy base 22 (as long as the bases 22 of adjacent trays can properly abut each other, as discussed below). The sidewalls 24 are inclined away from the base 22 so that the trays 20 can be stacked, and the incline is such that the trays can be separated easily so that the litter 12 falls down the sidewalls to the base 22 without much effort when the top tray 20 is lifted. The steeper (i.e. closer to vertical) the incline is made, the thinner the sidewalls 24 must be, relative to the base 22, in order to provide proper nesting of the trays. The sidewalls 24 should also be high enough to hold a substantial quantity of litter 12 to avoid penetration of a pet's liquid discharge to the base 22, and to prevent undue spillage when the tray 20 is shaken. Good results have been achieved by providing the sidewalls with an incline of about 110° from the base (i.e. about 20° from vertical), and a vertical height of about 4 in (101.6 mm) measured from the top of the base 22 to the lip of the outer periphery of the sidewalls.

The base 20 of each tray is perforated with a number of openings in the form of elongate, generally rectangularly shaped slots 26. The uniform width "W1" of each slot 26 is sized to permit (unused) litter 12 to pass through, but to prevent the passage of items to be disposed of, such as solid fecal matter, waste or clumped litter. Hence, the width "W1" should be at least the size of the largest individual particles of litter, but smaller than the items to be trapped. Good results have been achieved using a width "W1" of about 0.2 inches (5 mm).

In the FIG. 1 embodiment, the slots 26 are arranged parallel to one another, forming ribs 28 therebetween. The ribs 28 and portions of the base 20 around the openings form rib means defining the openings. A lengthy beam 29 bisects each of the slots 26 to form two rows of slots. The beam strengthens the perforated base 22 and reduces flexure of the ribs 28. The slots 26 should extend across substantially the whole base 22, both transversely and longitudinally (i.e. top to bottom and left to right, respectively, as viewed in FIG. 1), to facilitate sifting and eliminate "dead" spots or areas on the base 22 where litter may be trapped during sifting. Hence, for this same reason, the slots 26 should extend as close as possible to the ramp 21.

As the base 22 must be thicker than the side walls 24, the ribs 28 are formed of inverted U-section to reduce their thickness and weight. Thus each rib 28 has depending rectangular flanges.

An important aspect of the present invention is the arrangement of the slots 26 in a pre-set pattern such that the slots 26 of one tray are blocked by the base of another tray when the trays are nested on top of each other. For instance, in FIG. 2 the base of tray 20b abuts the base of tray 20a when both are nested so that the ribs of tray 20b block (i.e. form an interference pattern with) the slots of tray 20a to prevent passage of the litter 12 through the slots of tray 20a.

Figure 1A:
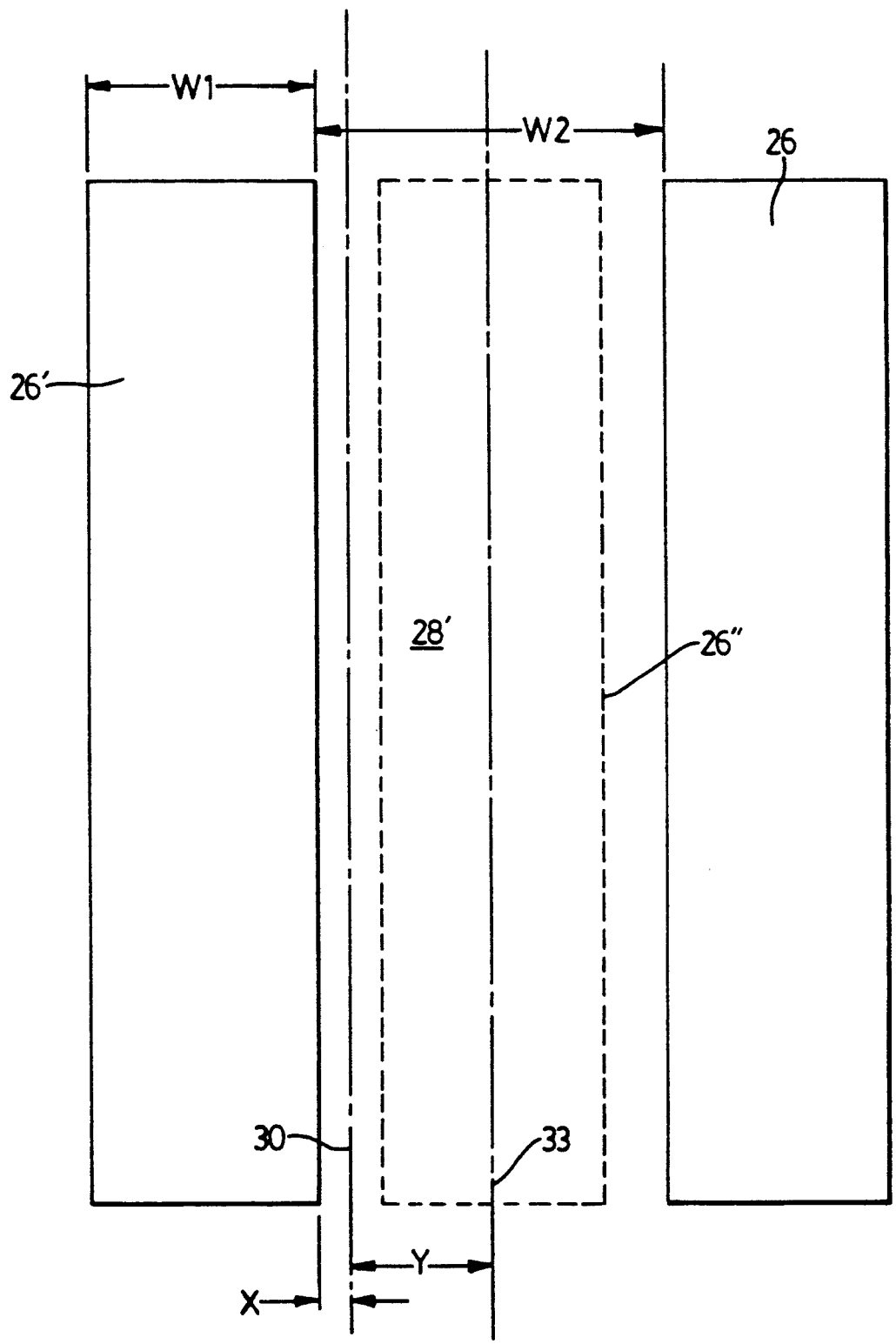
FIG. 1A is a detailed view of a portion of a base of the tray of FIG. 1.

The "interference pattern" is generally achieved by arranging the slots 26 parallel to, but asymmetrically about or off-set from, a center-line 30 of the base; and by making the width "W2" of the ribs 28 at least as great as, but preferably greater than, the width "W1" of the slots 26. The slots 26 are symmetrically arranged about the center-line 31. In addition, with reference to FIG. 1A, the slots and ribs should be arranged so that a rib 28' runs along the center line 30 with the rib's left edge being a distance "X" from the center line. The distance "X" is defined as being one half of the difference between the width W2 of the rib and the width W1 of the slot. In other words, a center line 33 of the rib 28' should be offset from the center line 30 of the tray by a distance "Y" equal to $W2/2 - (((W2-W1)/2)/2)$. As shown, it is preferred for the offset to be such that the slot of tray 20 (for example, shown in dotted outline and indicated with the reference numeral 26") is aligned with and covered by the rib 28' of a tray above it. Alternately, the slot of an upper tray should be blocked by the rib 28' of the tray below.

Hence, when two identical trays 20 are turned (i.e. rotatably off-set in a generally horizontal plane) 180° relative to one another and are nested, as are trays 20a and 20b in FIG. 2 for example, the interference pattern is achieved. With reference to FIG. 2, it will be appreciated that if the center line of slot 26' was the same as the center-line 30, rather than being offset from center-line 30, then the ribs of the lower tray 20b would not fully block the slots of the upper tray 20a, thus potentially allowing some litter 12 to pass through the slots 26 of both trays 20a and 20b, and right through the whole stack of trays. The danger of this occurring increases as the overlap between ribs of stacked trays decreases (i.e. as W2 approaches W1). Thus the ribs of one tray must cover the slots of another tray with an overlap around the edge of each slot. In the FIG. 1 embodiment, good results have been achieved using a slot width W1 of about 0.2 in.(5.0 mm) and a rib width W2 of about 0.3 in. (7.6 mm).

In the preferred embodiment each slot 26 and rib 28 has a uniform width W1 and W2, respectively, across the whole base 22, and the overlap is about the same on each edge of each slot. It will be appreciated that the widths W1 and W2 need not be uniform but may differ at different locations on the base, as long as symmetry is maintained about the line 30. As well, the overlap on each side of a slot need not be the same but may differ, as long as an interference pattern is achieved when the trays are rotatably off-set.

At least some of the sidewalls 24 of each tray should be shaped to provide handles or grips 32 to facilitate the removal of a top tray from a stack. A user's fingers should easily fit between the handles adjacent trays. The vertical spacing between handles of adjacent stacked trays is determined by the incline angle and/or the thickness of the base 22.

The handles may also be used to indicate the orientation of the trays to each other in a stack, so as to laterally offset the openings 26 and ribs 28 and create the interference pattern. For example, the handles 32 of the FIG. 1 embodiment of tray 20 extend only part way along the sidewalls 24. A user would know that a stack of trays 20 are all identically aligned (i.e. the slots 26 are all vertically aligned) if the handles 32 are all vertically aligned. However, in order to work properly, as in the stack of FIG. 2 where each tray is oriented 180° to an adjacent tray, the handles 32 are not vertically aligned but form a "zig-zag" pattern down the stack. It will be appreciated that other type of markers, tabs or colour schemes, for example, may be used as orientation indicators.

It may now be appreciated how the preferred embodiment of the invention functions. With trays 20a, 20b, 20c and 20d nested and oriented in a stack as shown in FIG. 2, litter 12 may be placed in the top tray 20. The litter 12 will only fill the slots 26 of tray 20a because ribs 28 of tray 20b block further passage of the litter down the stack. Once a pet has used the litter box, the solid waste and clamped litter may be separated from the unused litter by lifting the top tray 20a off of the stack and agitating tray 20a over tray 20b to pass the unused litter through the slots 26 and into the tray 20b. When only the solid waste and clumped litter are left in the tray 20a, they are discarded. The tray may also be further cleaned and washed if desired. With the tray 20a now empty, it is returned to the stack by nesting the tray 20a below tray 20d, ensuring that trays 20a and 20d are oriented 180° to each other in an interference pattern. The operation may now be repeated with tray 20b once the litter in tray 20b has been used, and so on perpetually. Extra litter must be added from time to time as desired.

It will be appreciated from the foregoing description that the sifting device may have as few as three stacked trays to operate. There must be at least two nested trays forming an interference pattern to ensure that material is contained and trapped when a third top tray is removed and the material therein sifted into the two lower nested trays.

It will further be appreciated from the foregoing that the tray 20 need not be rectangular. For example, the tray 20 may have a square or circular shape, the circular shape also being provided with bosses, indents or other means to indicate to the user how two adjacent trays should be placed to achieve the required interference pattern.

Figure 4:
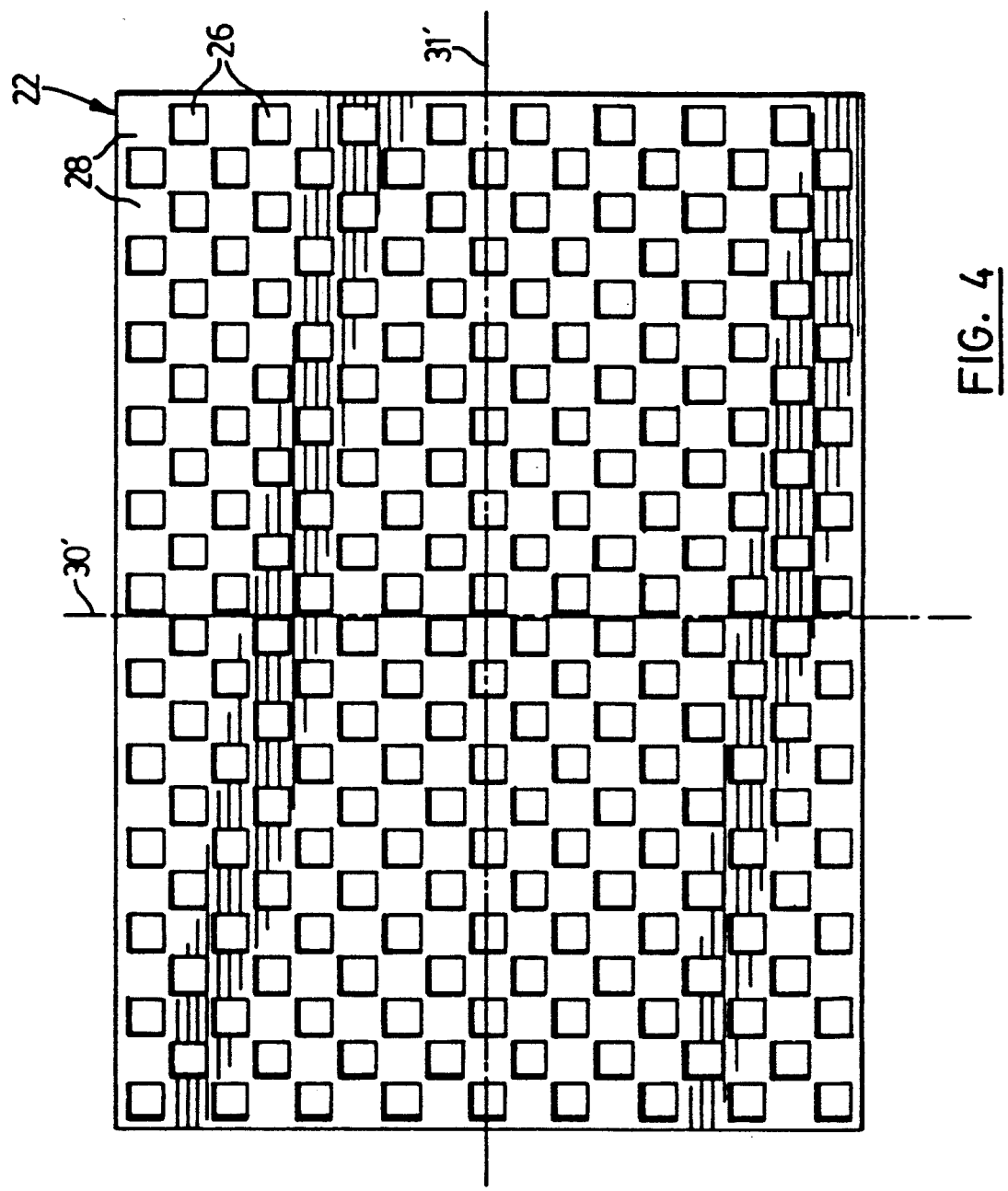
FIG. 4 shows an alternate pattern of openings in the tray of FIG. 1.

The slots 26 may also take on various shapes (e.g. circular, star-shaped, etc.) and arrangements on the base 22. In the FIG. 1 embodiment, for example, a number of spaced beams akin to beam 29 may be provided to break up each elongated slot into a series of much shorter, aligned, spaced rectangular or square openings running between the sidewalls. As well, an alternate staggered pattern of square openings 26 as shown in FIG. 4 may also be provided on the rectangular base 22. Both of these arrangements of openings will continue to provide an interference pattern when two trays are rotatably off-set 180° to each other because the openings are asymmetrically arranged about one center-line (namely 30, 30') and symmetrically arranged about the other center-line 31, 31', both of which lines are lines of symmetry for the base 22 itself. Preferably, the openings are of a uniform size and arranged in a uniform grid or array.

Figure 5:
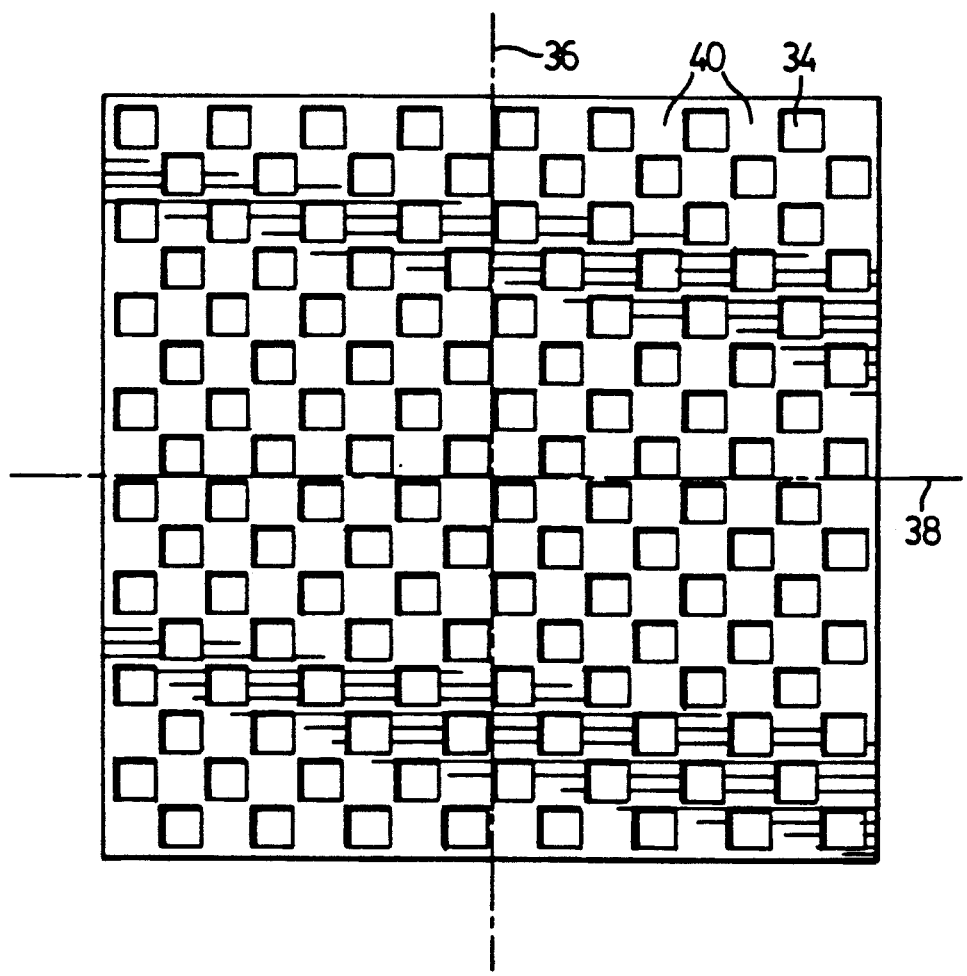
FIG. 5 shows another pattern of openings in a stacked array of square-shaped trays.
Figure 6B:
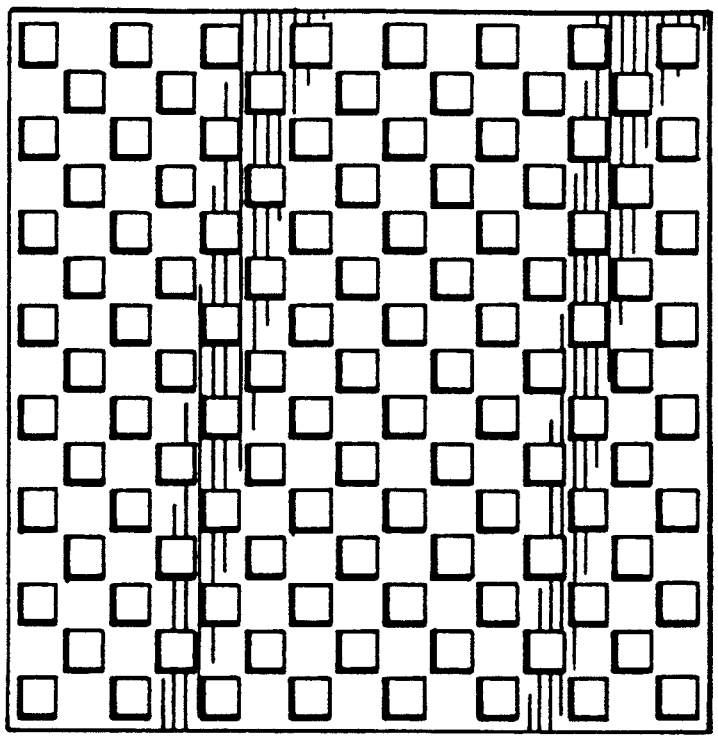
FIGS. 6A and 6B show yet another pattern of openings for a stacked array of trays according to the present invention.
Figure 6A:
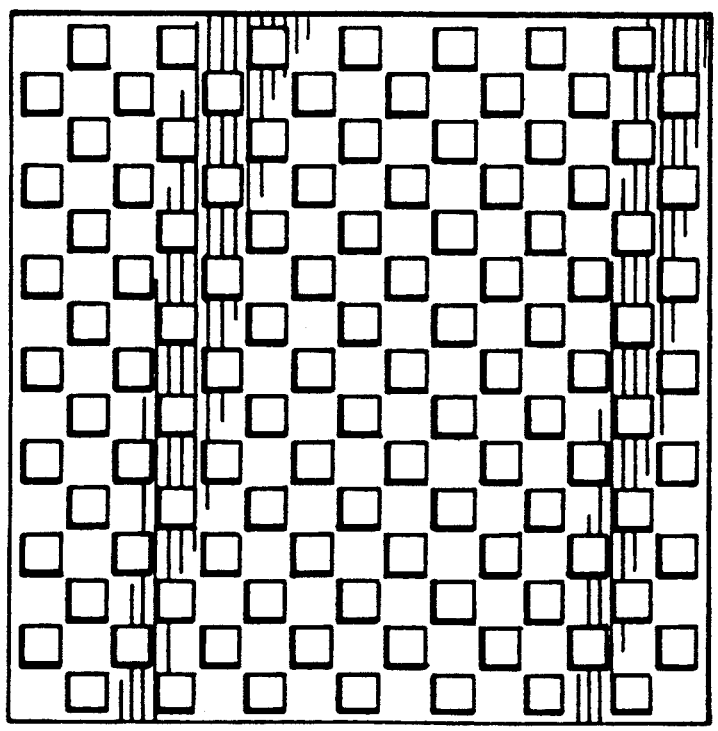

The rotatable off-set may be reduced from 180° to 90° or 45°, for example, depending on the number of lines of asymmetry about which the slots are oriented and the shape of the pan is plan view. Referring to FIG. 5, a "checker-board" pattern of square openings 34 is arranged asymmetrically about two lines, namely lines 36 and 38, on the square shaped base 22, which again are lines of symmetry for the base 22 alone. The openings 34 should be no larger than the square shaped ribs 40, shown as solid areas, in between (this applies to the FIG. 4 and 6 embodiments as well), so that two trays having this identical pattern can be rotatably off-set 90° to each other (i.e. rotated about the point of intersection 42 of the lines 36, 38) and nested to provide an interference pattern. Thus, as a general rule of thumb, it can be seen that where the slots are arranged asymmetrically about "n" lines of symmetry for the base itself and the pan is appropriately shaped, adjacent trays need only be off-set 180° to form an interference pattern.

It is noted that the ribs 40 are inverted U-shapes, similar to that shown in FIG. 2, forming flanges 41. The flanges 41 of the ribs 40 extend all of the way across the base 22 to form a rectangular grid of intersecting flanges to stiffen the base. Another example may be of a base having circular shaped openings arranged about four lines of symmetry, resulting in a 45° rotatable or angular off-set. An appropriate shape for the tray in this case may be octagonal. A further example is a circular tray with sector-shaped (or "pie-shaped") openings, provided with locking formations to ensure that trays only engage in an interference pattern.

It will further be appreciated that the tray 20 should be lightweight so that a stack of trays is readily liftable with minimal exertion, and at the same time each tray should be sturdy so that it does not warp or bend when filled with the siftable material or when being sifted. For example, a stiff plastic may be used using an injection molding process to form the trays. As noted, the ribs may further be provided with a hollow or an inverted U-shaped configuration as shown in FIG. 2 to minimize weight without unduly sacrificing strength.

Although the present invention has been described with reference to preferred embodiments thereof, it will be apparent to those skilled in the art that various alterations and modifications may be carried out without departing from the scope of the invention. For example, each tray in a stack of trays need not be identical. In a stack having 2 alternating pairs of nested trays —i.e. 4 trays similar to that shown FIGS. 1–3—each of the trays in a nested pair may have a different arrangement of openings. For instance, the top tray of the pair may have the arrangement shown in FIG. 6A, and the bottom tray of that pair may have a complimentary arrangement shown in FIG. 6B. The arrangements are like "black and white" inverse images of each other, except the square openings are smaller than the solid squares, to ensure overlap. As such, there is no asymmetry and interference cannot be achieved by rotation of a tray. Instead, it will be appreciated that an interference pattern is formed when both trays are nested in the orientation shown in FIGS. 6A and 6B. An advantage of this version is that the arrangement of openings on any one tray need not be symmetrical or asymmetrical about any center-line, providing a wide latitude for making openings in a variety of shapes and designs (for example, to resemble the outline of a cat's face). At least where a square base is used and there are two lines of symmetry, the user does not have to worry about proper orientation of the trays. A disadvantage of this version is the cost to manufacture because of the requirement for two different molds rather than one mold to produce a set of trays for one stack. Also, at least four, not three, trays are required per stack.

I claim:

1. A device for shifting a siftable material, the device comprising at least three nestable trays, each tray having a base and sidewalls projecting upwardly and outwardly from the base to retain a siftable material and the trays having corresponding profiles so that said trays may be nested done atop another to form a vertically stacked array of said trays capable of holding a quantity of said material, said base of each tray having a plurality of rib means for defining a plurality of openings sized to permit said material to pass through and to prevent the passage of substantially larger objects found in said material, said openings in each tray being arranged in a pre-set pattern wherein the openings of one of said trays are blocked by the rib means of at least one other tray when said trays are nested one atop another in a predetermined orientation.

each of said trays being capable of sifting said material by lifting the uppermost tray of said stacked array and allowing the material therein to pass through the openings, and with the other nested trays of said stacked array blocking one another to prevent passage of the material therethrough, the lifted tray being returnable to the bottom of said stacked array after being cleared of any retained objects.

2. The sifting device of claim 1 wherein said pre-set pattern of openings is arranged asymmetrically on said base about at least one line of symmetry for said base.

3. The sifting device of claim 2 wherein adjacent upper and lower trays in said vertically stacked array are nested together in a manner that said asymmetrical arrangement of openings of each adjacent tray is rotatably off-set about a vertical axis of said stacked array so that the openings in the adjacent upper tray are blocked by the rib means of the adjacent lower tray.

4. The sifting device of claim 3 wherein the openings of each of said trays are asymmetrically arranged about "n" lines of symmetry, and the trays are nestable in a multiple of an angular off-set of 180°/n.

5. The sifting device of claim 3, wherein the rib means are of a generally uniform size and the openings are of a generally uniform size, and wherein each rib means is at least as large as an opening.

6. The sifting device of claim 5 wherein said openings are uniformly spaced over a major portion of the base.

7. The sifting device of claim 6 wherein said openings comprise elongate rectangular slots arranged generally parallel to one another and extending substantially across said base.

8. The sifting device of claim 7, wherein the openings are generally square and the rib means are substantially square and of larger dimensions than the openings.

9. The sifting device of claim 6, wherein each rib means is larger than each opening, and whereby/each opening of a tray is overlapped on all sides by the rib means of an adjacent tray.

10. The sifting device of claim 6 wherein said openings are arranged in a rectangular grid, and are asymmetrically arranged about a line of symmetry for said base running parallel with an axis of the rectangular grid, each pair of adjacent trays in said stacked array being rotatably off-set by 180° about a vertical axis of said array so that the openings of one tray of each pair of trays are a blocked by the rib means of the other tray thereof.

11. The sifting device of claim 5 wherein each rib means is substantially hollow to reduce the volume of material forming said tray.

12. The sifting device of claim 11, wherein each rib means has depending flanges forming an inverted U-shape.

13. The sifting device of claim 12, wherein the flanges are continuous across on underside of each base, to form a reinforcing grid.

14. The sifting device of claim 3 wherein said base is planar and said sidewalls are inclined away from the base about 110°.

15. The sifting device of claim 14, wherein the trays are substantially identical to one another, and wherein at least one handle means of each tray includes an indicator to indicate to a user whether said adjacent trays are rotatably off-set.

16. The sifting device of claim 3 wherein an upper periphery of each sidewalls forms a handle means for user to lift a tray from said stacked array.

17. The sifting device of claim 16, wherein at least one handle of each tray is laterally offset.

18. The sifting device of claim 3, which comprises a pet litter container dimensioned for a pet and adapted to be placed on the ground.

19. The sifting device of claim 1 wherein two pairs of vertically nested trays are provided, the openings in the upper tray of each pair of trays having a pre-set pattern of openings which is blocked by the rib means of the other tray of said pair.

20. The sifting device of claim 19, wherein each pair of trays comprises an upper tray and a lower tray, wherein the upper trays are substantially identical with each other and the lower trays are substantially identical with each other.

21. The sifting device of claim 20, wherein the openings of each tray are symmetrical about at least one line of symmetry, and wherein the openings of each tray are uniformly spaced over a major portion of the base of the respective tray.

22. The sifting device of claim 21, wherein the openings of each tray comprise generally rectangular slots arranged parallel to one another and uniformly spaced, with the rib means correspondingly comprising rectangular strips, parallel to one another and uniformly spaced.

23. The sifting device of claim 21, wherein the openings of each tray are generally square and the rib means are substantially square and of larger dimension than the openings, with both the rib means and the openings being symmetrically arranged about two perpendicular lines of symmetry of the base.

* * * * *

UNITED STATES PATENT AND TRADEMARK OFFICE
CERTIFICATE OF CORRECTION

PATENT NO. : 5,325,815

DATED : July 5, 1994

INVENTOR(S) : Ralph P. Gumpesberger

It is certified that error appears in the above-identified patent and that said Letters Patent is hereby corrected as shown below:

On the title page:

Add to the list of references cited, under the heading U.S. Patent Documents, the following:

| | | | |
|---|---|---|---|
| U.S. 3,796,188 | 3/1974 | Bradstreet | 119/1 |
| U.S. 4,199,442 | 4/1980 | Popow | 209/408 |
| U.S. 4,030,449 | 6/1977 | Ruddick et al | 119/1 |
| U.S. 4,217,857 | 8/1980 | Geddie | 119/1 |
| U.S. 4,615,300 | 10/1986 | McDonough | 119/1 |
| U.S. 4,771,731 | 9/1988 | Derx et al | 119/1 |

Signed and Sealed this

Fifth Day of September, 1995

Attest:

Attesting Officer

BRUCE LEHMAN

Commissioner of Patents and Trademarks